(12) United States Patent
Higgins et al.

(10) Patent No.: US 11,094,166 B2
(45) Date of Patent: Aug. 17, 2021

(54) SYSTEM, DEVICE, AND METHOD TO DETECT UNUSUAL ACTIVITY IN ELECTRONIC RECORDS

(71) Applicant: IGT, Las Vegas, NV (US)

(72) Inventors: Kevin Higgins, Reno, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/407,445

(22) Filed: May 9, 2019

(65) Prior Publication Data

US 2020/0357234 A1    Nov. 12, 2020

(51) Int. Cl.
*G07F 17/32* (2006.01)
*G06F 21/31* (2013.01)

(52) U.S. Cl.
CPC ........ *G07F 17/3241* (2013.01); *G06F 21/316* (2013.01); *G07F 17/3239* (2013.01)

(58) Field of Classification Search
None
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 2016/0104346 A1* | 4/2016 | Ovalle | G07F 17/3209 463/17 |
| 2017/0236370 A1* | 8/2017 | Wang | G07F 17/3218 463/25 |
| 2019/0180558 A1* | 6/2019 | Merati | G07F 17/3223 |

* cited by examiner

*Primary Examiner* — James S. McClellan
*Assistant Examiner* — Peter J Iannuzzi
(74) *Attorney, Agent, or Firm* — Sheridan Ross P.C.

(57) ABSTRACT

A system can be capable of receiving and storing electronic records associated with adjustments to an electronic resort wallet from a gaming device and/or other funds transfers using another device. Where the electronic record includes information such as an identifier of the gaming device, a player ID, a timestamp, a transaction amount, and a transaction type. The system may further be capable of using rules to group related electronic records into a set of related electronic records. The system may also be capable of reviewing a set of related electronic records to determine if the related records indicate unusual activity, and in response to detecting unusual activity, causing the system to trigger an alert.

17 Claims, 8 Drawing Sheets

Electronic Records Database 552

| No. | Player ID | Wallet Type | Time/Date | Amount | Debit/Credit | Transfer to an External Acct? |
|---|---|---|---|---|---|---|
| 1 | 1234 | Gaming | 4/5/2019 12:30:45 | $5000.00 | Debit | No |
| 2 | 1234 | Gaming | 4/5/2019 12:31:13 | $4978.52 | Credit | No |
| 3 | 1234 | Gaming | 4/5/2019 12:32:01 | $6000.00 | Debit | Yes |
| 4 | 2346 | Gaming | 4/5/2019 12:32:45 | $20.00 | Credit | No |
| 5 | 5780 | Gaming | 4/5/2019 12:32:45 | $1.25 | Debit | No |
| 6 | 1234 | Retail | 4/5/2019 12:32:45 | $5.27 | Debit | No |
| 7 | 3667 | Sports Betting | 4/5/2019 12:32:45 | $500.00 | Debit | No |
| 8 | 1987 | Bingo | 4/5/2019 12:32:45 | $200.00 | Debit | No |
| 9 | 2780 | Retail | 4/5/2019 12:32:45 | $1.20 | Credit | No |

*Fig. 5*

SYSTEM, DEVICE, AND METHOD TO DETECT UNUSUAL ACTIVITY IN ELECTRONIC RECORDS

BACKGROUND

The present disclosure is generally directed toward grouping related electronic records, monitoring for unusual or fraudulent activity, and providing alerts related to detected fraudulent activity.

It is becoming increasingly desirable for casinos to reduce cash handling for both customers and operators. Cash can provide barriers to gaming for the player, as well as provide inefficiencies for the operator. In an effort to reduce cash handling, casinos have deployed ticket vouchers. Today a ticket/voucher, in the parlance of the Gaming Standards Association, represents an amount of money that is cashed out from a machine. At the time of cash out, the amount of money on a gaming machine's credit meter is zeroed out and a voucher is issued or printed from the machine representing the amount of money that was on the credit meter at the time of zeroing. Printed on the ticket/voucher is a barcode and often other information such as the date, the amount of money represented by the ticket/voucher, and information identifying the property and the gaming machine where it was printed.

BRIEF SUMMARY

In certain embodiments, the present disclosure relates to a fraud monitoring system, device, and method used to group and monitor electronic records. In some embodiments, a fraud monitoring system is provided that includes: a communication interface that facilitates communications with a gaming device; a processor coupled with the communication interface; and a computer-readable storage medium coupled with the processor, the computer-readable storage medium including processor-executable instructions that, when executed by the processor, cause the processor to: receive and store electronic records from the gaming device, where the electronic records are associated with adjustments to an electronic resort wallet; execute a rules engine to group related electronic records into a set of related electronic records; determine if the set of related electronic records comprise unusual activity; and trigger an alert when unusual activity is detected.

In some embodiments a method of operating a fraud monitoring system is provided that includes: receiving and storing electronic records from a gaming device, where the electronic records are associated with adjustments to an electronic resort wallet; executing a rules engine to group related electronic records into a set of related electronic records; determining if the set of related electronic records comprises unusual activity; and triggering an alert with unusual activity is detected.

In some embodiments, a server device is provided that includes: a communication interface that facilitates machine-to-machine communications; a processor coupled with the communication interface; and a computer-readable storage medium coupled with the processor and including instructions that are executable by the processor, where the instructions include: instructions that receive and store electronic records from a gaming device, where the electronic records are associated with adjustments to an electronic resort wallet; instructions that execute a rules engine to group related electronic records into a set of related electronic records; instructions that determine if the set of related electronic records comprise unusual activity; and instructions that trigger an alert when unusual activity is detected.

Additional features and advantages are described herein and will be apparent from the following Description and the figures.

BRIEF DESCRIPTION OF THE SEVERAL VIEWS OF THE DRAWINGS

FIG. 5 is a block diagram depicting an illustrative database used in accordance with embodiments of the present disclosure;

DETAILED DESCRIPTION

Figure 1A:
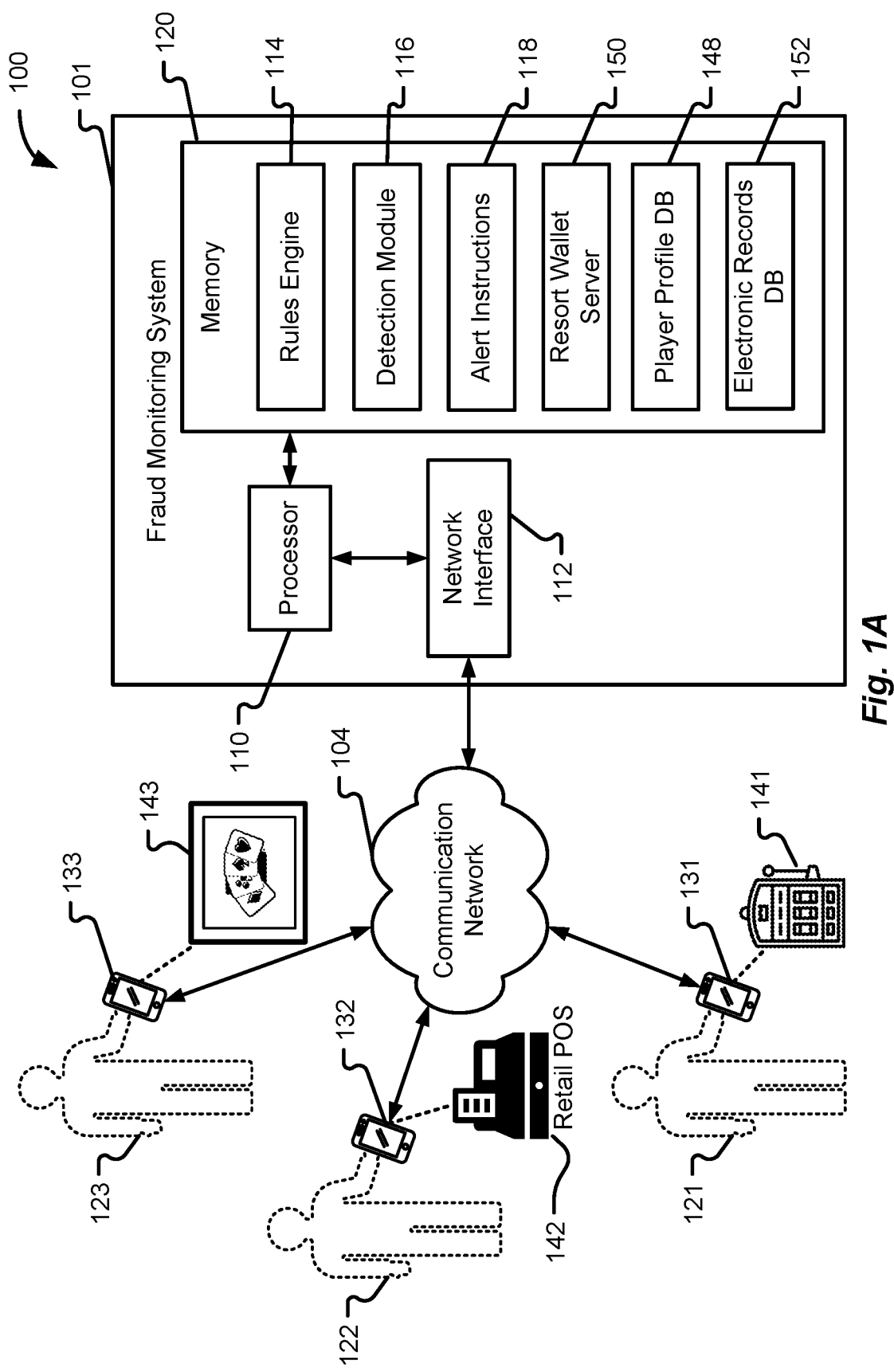
FIG. 1A is a block diagram of a gaming environment in accordance with embodiments of the present disclosure.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an Electronic Gaming Machine (EGM) as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, a personal gaming device, multiple personal gaming devices, a mobile device, multiple mobile devices, or combinations thereof.

As noted above, in various embodiments, the gaming system includes a gaming device in combination with a central server, central controller, or remote host. In such embodiments, the EGM (or gaming device) is configured to communicate with the central server, central controller, or remote host through a data network or remote communication link. In certain such embodiments, the EGM (or gaming device) is configured to communicate with another EGM (or gaming device) through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the EGM (or gaming device) includes at least one EGM (or gaming device) processor configured to transmit and receive data or signals representing events, messages, commands, or any other suitable information between the EGM (or gaming device) and the central server, central controller, or remote host. The at least one processor of that EGM (or gaming device) is configured to execute the events, messages, or commands represented by such data or signals in conjunction with the operation of the EGM (or gaming device). Moreover, the at least one processor of the central server, central controller, or remote host is configured to transmit and receive data or signals representing events, messages, commands, or any other suitable information between the central server, central controller, or remote host and the EGM (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or gaming device). Further, one, more than one, or each of the functions of the at least one processor of the EGM (or gaming device) may be performed by the at least one processor of the central server, central controller, or remote host.

In certain such embodiments, computerized instructions for controlling any games (such as any primary or base games and/or any secondary or bonus games) displayed by the EGM (or gaming device) are executed by the central server, central controller, or remote host. In such "thin client" embodiments, the central server, central controller, or remote host remotely controls any games (or other suitable interfaces) displayed by the EGM (or gaming device), and the EGM (or gaming device) is utilized to display such games (or suitable interfaces) and to receive one or more inputs or commands. In other such embodiments, computerized instructions for controlling any games displayed by the EGM (or gaming device) are communicated from the central server, central controller, or remote host to the EGM (or gaming device) and are stored in at least one memory device of the EGM (or gaming device). In such "thick client" embodiments, the at least one processor of the EGM (or gaming device) executes the computerized instructions to control any games (or other suitable interfaces) displayed by the EGM (or gaming device).

In various embodiments in which the gaming system includes a plurality of EGMs (or gaming devices), one or more of the EGMs (or gaming devices) are thin client EGMs (or gaming devices) and one or more of the EGMs (or gaming devices) are thick client EGMs (or gaming devices). In other embodiments in which the gaming system includes one or more EGMs (or gaming devices), certain functions of one or more of the EGMs (or gaming devices) are implemented in a thin client environment, and certain other functions of one or more of the EGMs (or gaming devices) are implemented in a thick client environment. In one such embodiment in which the gaming system includes an EGM (or gaming device) and a central server, central controller, or remote host, computerized instructions for controlling any primary or base games displayed by the EGM (or gaming device) are communicated from the central server, central controller, or remote host to the EGM (or gaming device) in a thick client configuration, and computerized instructions for controlling any secondary or bonus games or other functions displayed by the EGM (or gaming device) are executed by the central server, central controller, or remote host in a thin client configuration.

In certain embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a local area network (LAN) in which the EGMs (or gaming devices) are located substantially proximate to one another and/or the central server, central controller, or remote host. In one example, the EGMs (or gaming devices) and the central server, central controller, or remote host are located in a gaming establishment or a portion of a gaming establishment.

In other embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a wide area network (WAN) in which one or more of the EGMs (or gaming devices) are not necessarily located substantially proximate to another one of the EGMs (or gaming devices) and/or the central server, central controller, or remote host. For example, one or more of the EGMs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or gaming devices) are located. In certain embodiments in which the communication network includes a WAN, the gaming system includes a central server, central controller, or remote host and an EGM (or gaming device) each located in a different gaming establishment in a same geographic area, such as a same city or a same state. Gaming systems in which the communication network includes a WAN are substantially identical to gaming systems in which the communication network includes a LAN, though the quantity of EGMs (or gaming devices) in such gaming systems may vary relative to one another.

In further embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include an internet (such as the Internet) or an intranet. In certain such embodiments, an Internet browser of the EGM (or gaming device) is usable to access an Internet game page from any location where an Internet connection is available. In one such embodiment, after the EGM (or gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; an associated mobile wallet; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games; and displays those plays via the Internet browser of the EGM (or gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a user interacting with one or more gaming devices. It should be appreciated that a gaming device, as described herein, may include a gaming machine, mobile devices, servers, and other computational devices. While embodiments of the present disclosure will be described in connection with the example of a mobile device, personal gaming device, Electronic Gaming Machine (EGM), or computing device used in association with an electronic resort wallet, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein. Furthermore, it should be appreciated that embodiments of the present disclosure may apply to gaming devices that operate games other than slot games and/or other than lottery games. For instance, embodiments of the present disclosure may be used in connection with any type of game of chance (e.g., bingo, keno, slots, video poker, table games, etc.), any type of game of skill (e.g., darts, memory games, matching games, strategy games, etc.), and/or any type of hybrid game of chance/skill.

Embodiments of the present disclosure will be described in connection with a fraud monitoring system in communication with one or multiple gaming devices that enable users to use an electronic resort wallet in gaming and non-gaming transactions. While certain embodiments of the present disclosure will reference the use of a mobile device, such as a smartphone that enables players to participate in electronic transactions, it should be appreciated that embodiments of the present disclosure are not so limited. For instance, any computing device, or collection of computing devices may be used to facilitate electronic transactions in a gaming establishment. Additionally, any device comprising a patron facing User Interface (UI) used to cause funds transfers, such as to/from players' cards and/or gaming machines, may communicate with the fraud monitoring system and generate electronic records associated with each transaction. In some embodiments, the UI may comprise an Electronic Gaming Machine (EGM), a kiosk, or a PC like device at the cashier cage.

Embodiments of the present disclosure provide players with the ability to go cashless at gaming machines, table games, sports betting, bingo, etc. and retail transactions. Although tickets/vouchers reduce cash handling when players move from machine to machine, players still need to bring cash with them and insert cash into the machine initially. Additionally, there is no way to replace the value of a lost voucher. Another solution used to reduce cash handling is Smart/Mag cards, which function like a pre-paid card in gaming machines. However, these cards also require the player to use a cashier/kiosk to add funds. Additionally, some wagers, such as sports betting and table games do not readily accept tickets/vouchers and/or Smartcards. Furthermore, the present disclosure allows players to transfer funds directly to/from his or her external accounts, thereby reducing the need for players to bring cash to the casino. Moreover, the present disclosure provides interconnected system for gaming and non-gaming transactions.

Embodiments of the present disclosure provide an enhancement to fraud monitoring in electronic records in casinos to solve the problems where a person may use the casino for money laundering or other illicit purposes. Embodiments of the present disclosure enable the operator to aggregate electronic records associated with transactions on the property, group related electronic records, and analyze the related records to determine if there is unusual activity. The transactions may be conducted using a gaming device, a mobile device, a kiosk, an Electronic Gaming Machine (EGM), and/or other device—including combinations thereof.

Embodiments of the present disclosure also leverage an electronic resort wallet to interconnect disparate transactions and reduce the need for cash handling. An electronic resort wallet is capable of interconnecting all the disparate funding and wallet systems into a single view for the player. Using a device with the resort wallet installed, a player may pair the device with a gaming machine or Point of Sale (POS) system to complete transactions. For example, a player may pair their device in order to add credits to a gaming machine such as a slot machine. In another example, a player may pair his device with a video poker machine. In yet another example, a player may pair his device POS system to conduct a retail transaction. In some examples, the retail transaction may comprise a refund. Additionally, a player may pair her device with another device that allows the player to receive casino chips for table games or make wagers in sports betting. In some embodiments, a player may use a personal device such as a mobile device to interact with the electronic resort wallet. In other embodiments, the player may use other devices, such as a kiosk or a gaming machine to interact with the resort wallet.

In addition, the player is able to transfer funds between the various wallet systems, and also transfer funds to/from external accounts. For example, the electronic mobile wallet may include a separate wallet for: retail, gaming, bingo, keno, lottery, and sports betting transactions. The player picks the appropriate wallet for the transaction. In some embodiments, a player may transfer funds between wallets. For example, the player may transfer funds from a gaming wallet to a retail wallet or vice versa. In some embodiments, the player may use an external bank account to add funds to the electronic mobile wallet. For example, the player may link his checking or savings account with Wells Fargo® and be able to transfers funds directly to/from his external checking/savings account with the electronic resort wallet. This further reduces cash handling in casinos, as the players do not need to bring cash with them to use in machines or to add funds to a smart card using a cashier/kiosk on site. Additionally, funds in the electronic resort wallet may be transferred out to an external account. Also, the electronic resort wallet may keep a history of transactions, allowing a player to track and/or review her transactions. In some embodiments, historical transactions are used to continually improve detection of unusual activity. In some examples, an Artificial Intelligence (AI) module may use historical transactions and machine learning to improve detection of unusual activity.

The electronic resort wallet facilitates the transfers of funds around the casino to various gaming verticals (e.g., gaming machines, sports betting, table games, etc.) and to retail for non-gaming transactions. The electronic resort wallet also facilitates the transfer of funds to and from external funding entities. In some instances, individuals may use the casino for an unlawful purpose or manner, for example, money laundering. A player or several players, could enter a gaming establishment with a large sum of cash. The player(s) could then go from machine to machine, deposit the cash, perhaps play a few games to give the appearance of a normal player, and then cash out. Individuals may also try to use the electronic resort wallet in a similarly unlawful manner. For example, the player adds a large amount to her resort wallet, perhaps through a transfer from her external checking account. The player may then make the appearance of playing at one or more machines, and then transfers the funds to an external account, in some cases a different account than was used in the initial transfer to the resort wallet. In some cases, the player(s) may have several accounts to transfer the funds to, such that any single funds transfer to an external account would not raise suspicion. Additionally, the external accounts may be with multiple bank institutions, making such transfers difficult to track/notice. In some cases, the transfer may also be in relatively small amounts that would further obfuscate the transactions. Today banks are required to issue a Suspicious Activity Report (SAR) when a funds transfer of more than $10,000.00 is performed. A SAR may be issued for transfers in smaller amounts, if such activity is deemed suspicious.

The fraud monitoring system allows an operator to track attempts at fraudulent activity, such as money laundering at a casino, by allowing operators to aggregate multiple transactions by a player or player account, or otherwise detecting that transactions are related. Each transaction is associated with an electronic record. In some examples, the fraud monitoring system receives the electronic records from devices performing the transactions. The electronic records may be generated and transferred by many different devices, which may or may not be located on the casino premises. In other examples, the devices conducting the transactions transfer data to the fraud monitoring system, which then generates the electronic records. The fraud monitoring system reviews the records, to group related electronic records into a set of related records. The set of related records is reviewed to determine if unusual activity is detected. In some embodiments, the records are processed using an Artificial Intelligence module, this is advantageous to merely setting rules. In other words, an alert may be triggered based on two records, while in other cases the alert is triggered based on five records. The AI module may relate records based on multiple criteria such as, time and amounts, player identity and amounts, etc. That is to say, the AI module is able to detect patterns and/or behaviors that may constitute unusual activity and may learn from historical transactions. Additionally, a specified amount is not required. Multiple electronic records in relatively small amounts may trigger an alert, while several electronic records in larger amounts may not. If unusual activity is detected, an alert is triggered. In some examples, a SAR may be issued. In some embodiments, the alert may comprise flagging a player for further monitoring and/or adjusting thresholds (e.g., time periods, amounts, number of transactions, etc.).

The fraud monitoring system takes advantage of the unique placement of the electronic resort wallet and its ability to correlate transactions to a player and the player's associated accounts. For example, a player may use several different external bank accounts, perhaps with different banking institutions. The banking institutions would only be aware of transfers to/from accounts held at their institution, and therefore suspicious activity involving multiple banking institutions would normally go undetected. The system could also take advantage of the fact that the electronic resort wallet supports retail transactions, allowing players to make use of the wallet in non-gaming purchases, further reducing cash handling on premises. Electronic records associated with non-gaming transactions may also be supplied to the fraud monitoring system. In some embodiments, the system may monitor one property at one location. In other embodiments, the system may monitor multiple properties owned by the same corporation. In yet other embodiments, the system may provide a centralized monitoring system for multiple properties owned by multiple companies.

In some embodiments, the system may use the player's name, player's account, loyalty card number, mobile device, and/or external accounts to group related electronic records. Electronic records may be further group based on time, such that temporal records may be group together based on their occurrence within a specified amount of time of each other. Furthermore, electronic records may be grouped based on amount, for example, a credit followed by a debit that is in a similar amount or vice versa. Other factors may be used to group the electronic records. In some embodiments, information from multiple sources may be used to group electronic records. For example, images may be analyzed to determine that certain transaction were performed by the same individual, even though the transactions are otherwise unrelated.

Once the electronic records have been grouped into a set of related electronic records, the set of records may be analyzed based on factors, such as time, amount, patterns/repeating, small amounts to multiple different accounts, amounts (threshold may be adjusted based on player status (e.g., new/old, high roller, known player, etc.), frequency, types, country-based laws/regulations. The electronic records are analyzed for unusual activity, and if unusual activity is detected, an alert may be triggered. In some examples, an AI module is used to analyze the records. In some embodiments, the system may have different alerts/actions for different triggers. For example, a transfer over $10,000.00 may automatically trigger the initiation of a SAR, as required by law. The alerts may be configured by the casinos and may be based on local laws and/or regulations. In some embodiments, casino employees may be alerted to determine whether further escalation is necessary. In other embodiments, the system may bypass casino employees and directly alert a law enforcement agency or other third party.

Embodiments of the present disclosure provide a fraud monitoring system capable of aggregating electronic transactions for one location, commonly owned properties, or multiple establishments, regardless of ownership. In some embodiments, an electronic resort wallet is used for gaming and non-gaming transactions, and electronic records associated with each transaction is stored in a record database. Additionally, electronic records may be generated by devices other than gaming devices. For example, a player may use a device to interact with the electronic resort wallet, in some embodiments, a player's card may be linked to the electronic resort wallet, and the player may access the electronic resort wallet by using the player's card. In some embodiments, a player may simply enter information associated with the electronic resort wallet and be able to access the electronic resort wallet on that device. For example, the electronic resort wallet may be associated with a unique identifier, the player may enter the unique identifier and also a password and be able to access the electronic resort wallet from any device. In other examples, a player may use a kiosk to add funds to his player's card, which generates an electronic record in association with the transaction and the electronic record is transferred to the fraud monitoring system. In another example, a player may use the UI on an EMG to add funds directly to the EGM, similarly, an electronic record is generated in associated with that transaction.

In some embodiments, a rules engine processes the electronic records to group related records into a set of records. Furthermore, the sets of records are analyzed to determine if there is any unusual activity. If unusual activity is detected, an alert may be triggered. In some embodiments, the alert may be local to the property/casino, and a casino employee may determine if further escalation is necessary. In other embodiments, the alert may be sent directly to a regulating authority or law enforcement agency, bypassing any casino employee.

The electronic resort wallet may be used to place a sports wager, to add funds to a gaming machine, in retail transactions, etc. When a user performs a transaction using the electronic resort wallet, an electronic record associated with the transaction is created. In some embodiments, the electronic record includes information such as a unique identifier for the record, wallet type, player ID, mobile device ID, amount, timestamp, type, credit/debit, external account information, etc.

In some embodiments, the electronic resort wallet may have separate wallets for different activities. For example, the resort wallet may include "sub-wallets" for gaming machines, table games, sport betting, and retail purchases. In some embodiments, a user may create wallets, in other embodiments, the "sub-wallets" may be built in. In some embodiments, a player may set wallet parameters, such as daily spending limits, set an access PIN, set notifications, etc. Additionally, a user may transfer funds from one wallet to another wallet, make transfers to/from an external account, request credit, repaid credit, etc. In some embodiments, a set ID may be added to the electronic record once it has been grouped.

With reference initially to FIG. 1A, details of an illustrative gaming environment 100 will be described in accordance with at least some embodiments of the present disclosure. The components of the gaming environment 100, while depicted as having components, is not necessarily limited to the examples depicted herein. Rather, a system according to embodiments of the present disclosure may include one, some, or all of the components depicted in the environment 100 and does not necessarily have to include all of the components in a single device. For instance, the components of a system may be distributed amongst a plurality of servers and/or other devices without departing from the scope of the present disclosure.

In FIG. 1A, the gaming environment 100 is shown to include players 121-123, operating user devices 131-133, respectively. The gaming environment 100 also includes a communication network 104 that interconnects and facilitates machine-to-machine communications between one or multiple user devices 131-133 and fraud monitoring system 101. In some embodiments, the fraud monitoring system 101 includes instructions to operate an electronic resort wallet server 150. Although the resort wallet server 150 is shown as part of the fraud monitoring system 101, it should be appreciated that the resort wallet server 150 may be on a separate device or distributed over several devices. It should be appreciated that the resort wallet server 150 may facilitate transactions associated with the resort wallet, regardless of the device used to access the resort wallet. In some embodiments, a player may use a personal device such as a mobile device to interact with the resort wallet. For example, the resort wallet may comprise an app on the player's mobile device. In other embodiments, the player may use other devices, such as a PC, a kiosk a gaming machine, or etc. to interact with the resort wallet.

It should be appreciated that the communication network 104 may correspond to one or many communication networks without departing from the scope of the present disclosure. In some embodiments, the various devices may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, Wi-Fi, CDMA, GSM, HTTP, TCP/IP, UDP, etc.

In FIG. 1A, the gaming environment 100 also includes gaming devices 141 and 143, and retail Point of Sale (POS) system 142. Players 121-123 may access an electronic resort wallet on user devices 131-133 to interact with slot machine 141, retail POS 142, and video poker machine 143, respectively. In some embodiments, the gaming devices 141 and 143 may be distributed throughout a single property or premises (e.g., a single casino floor) or the gaming devices 141 and 143 may be distributed among a plurality of different properties. It should also be appreciated that the gaming devices 141 and 143 may or may not present the same type of game to player 121 and 123, respectively. For instance, the first gaming device 141 may correspond to a gaming machine that presents a slot game to the player 121, the second gaming device 143 may correspond to a video poker machine, or a plurality of different games for selection and eventual play by the player 123. It may be possible for the some of the gaming devices 141 and 143 to communicate with one another via the communication network 104. In some embodiments, one or more of the gaming devices 141 and 143 may only be configured to communicate with a centralized management server. Although not depicted, the gaming environment 100 may include a separate server or collection of servers that are responsible for managing the operation of the various gaming devices 141 and 143 in the gaming environment 100.

It should also be appreciated that the fraud monitoring system 101 may or may not be co-located with one or more gaming devices 141 and 143, and retail POS 142 in the same property or premises. Thus, one or more gaming devices 141 and 143, and retail POS 142 may communicate with the fraud monitoring system 101 over a WAN, such as the Internet. In such an event, a tunneling protocol or Virtual Private Network (VPN) may be established over some of the communication network 104 to ensure that communications between the devices 141-143 and a remotely-located system 101 are secured.

The gaming devices 141 and 143 may correspond to a type of device that enables players 121 and 123 interaction in connection with playing games of chance. A gaming device 141 and 143 may include any type of known gaming device such as an EGM, a slot machine, a table game, an electronic table game (e.g., video poker), a skill-based game, etc. In addition to playing games on a gaming device 141 and 143, the players 121 and 123 may also be allowed to interact with and play games of chance on the mobile devices 131 and 133, respectively.

The user device 131 and 133 may correspond to a player's personal device or to a device issued to the player during the player's visit at a particular casino. It should be appreciated that the players 121 and 123 may play games directly on their devices 131 and 133 and/or the devices 131 and 133 may be in communication with a gaming device 141 and 143 such that the user devices 131 and 133 allows the players 121 and 123 to add funds to the gaming device 141 and 143. As shown in FIG. 1, the user devices 131-133 may be in communication with the communication network 104 or in direct communication (e.g., via Bluetooth, Wi-Fi, etc.) with a gaming device and/or POS system. Non-limiting examples of user devices 131-133 include a cellular phone, a smart phone, a tablet, a wearable device, an augmented reality headset, a virtual reality headset, a laptop, a Personal Computer (PC), or the like.

The fraud monitoring system 101 is further shown to include a processor 110, memory 120, and a network interface 112. These resources may enable functionality of the fraud monitoring system 101 as will be described herein. For instance, the network interface 112 provides the fraud monitoring system 101 with the ability to send and receive communication packets or the like over the communication network 104. The network interface 112 may be provided as a network interface card (NIC), a network port, drivers for the same, and the like. Communications between the components of the fraud monitoring system 101 and other devices connected to the communication network 104 may all flow through the network interface 112.

The processor 110 may correspond to one or many computer processing devices. For instance, the processor 110 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 110 may be provided as a microprocessor, Central Processing Unit (CPU), or plurality of microprocessors that are configured to execute the instructions sets and programs stored in memory 120. Upon executing the instruction sets and/or programs stored in memory 120, the processor 110 enables various monitoring functions of the fraud monitoring system 101.

The memory 120 may include any type of computer memory device or collection of computer memory devices. The memory 120 may be volatile or non-volatile in nature and, in some embodiments, may include a plurality of different memory devices. Non-limiting examples of memory 120 include Random Access Memory (RAM), Read Only Memory (ROM), flash memory, Electronically-Erasable Programmable ROM (EEPROM), Dynamic RAM (DRAM), etc.

The memory 120 may be configured to store the instruction sets depicted in addition to temporarily storing data for the processor 110 to execute various types of routines or functions. Although not depicted, the memory 120 may include instructions that enable the processor 110 to store data into a player profile database 148 and/or an electronic records database 152 and retrieve information from the databases. Alternatively, or additionally, as shown, the player profile database 148 or data stored therein may be stored internal to the fraud monitoring system 101 (e.g., within the memory 120 of the fraud monitoring system 101 rather than in a separate database). Alternatively, or additionally, as illustrated, the electronic records database 152 or data stored therein may be stored internal to the fraud monitoring system 101.

The illustrative instruction sets and modules that may be stored in memory 120 include, without limitation, a rules engine instruction set 114, a detection module 116, and an alert instruction set 118. Functions of the fraud monitoring system 101 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the fraud monitoring system 101. Said another way, the particular instruction sets depicted in FIG. 1 should not be construed as limiting embodiments described herein.

In some embodiments, the rules engine instruction set 114, when executed by processor 110, may enable fraud monitoring system 101 to group related electronic records into one or more sets of related records. In some embodiments, an electronic record may be part of more than one set of related electronic records. In addition, electronic records may be grouped using different factors in order to further detect patterns and/or unusual activity. That is to say, one configuration to group related electronic records may not result in detection of unusual activity, while a different configuration, which may include some of the same records, does result in detection of unusual activity. For example, records may be grouped by time, player, user device, gaming device, etc. In some embodiments, the rules engine instruction set 114 is configured to perform any action consistent with the receiving, storing, grouping, managing, etc. the electronic records.

The detection module instruction set 116, when executed by the processor 110, may enable the fraud monitoring system 101 to analyze related electronic records to determine if the related electronic records constitutes unusual activity. For example, the detection module 116 may determine a total amount of adjustments made, and if the total adjustments made within a predetermined time period exceeds a threshold, that may be considered unusual activity.

In other examples, the adjustment may involve a single transaction, but still seem suspicious. In another example, the detection module 116 may look for a total amount transferred to one or more external accounts within a specified time period. In some embodiments, certain transaction may trigger the system 101 to automatically extend the time period under consideration. The alerts instruction set 118, when executed by the processor 110, may enable the fraud monitoring system 101 to send an alert when unusual activity is detected. The alert instruction set 118 may specify different alerts for different triggers. For example, an alert may comprise notification to a casino employee, another alert may be directed to law enforcement. In some embodiments, the alert may comprise an indication that further monitoring is required.

Figure 1B:
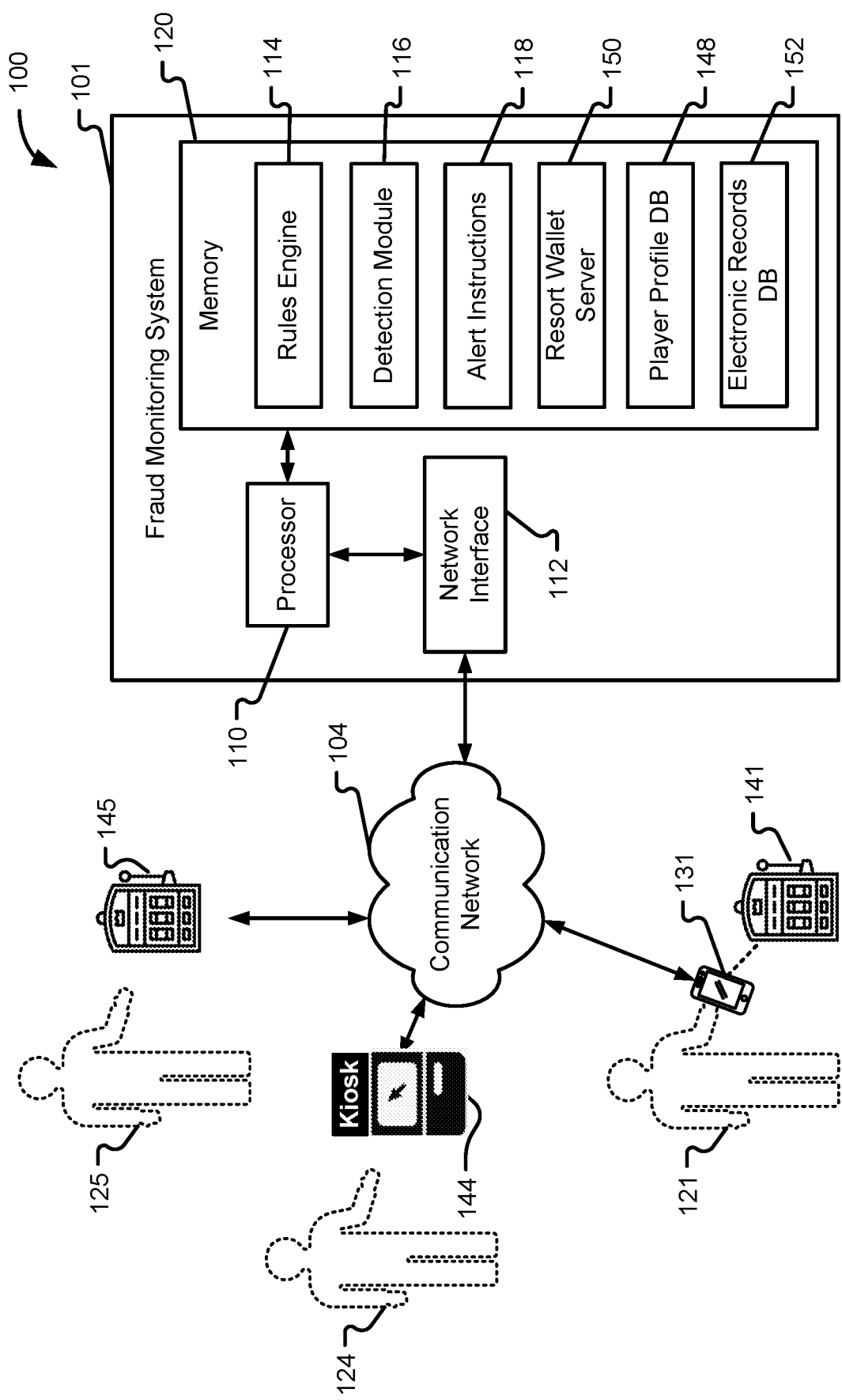
FIG. 1B is a block diagram of a gaming environment in accordance with embodiments of the present disclosure.

FIG. 1B illustrates an alternative configuration of the gaming environment 100. FIG. 1B shows player 124 interacting with the kiosk 144, which is in communication with the fraud monitoring system 101. For example, player 124 may use the kiosk 144 to add funds to a player's card. The kiosk 144 generates an electronic record associated with the transaction to add funds to the player's card and transfers the electronic record to the fraud monitoring system 101. Player 125 is directly interacting with the gaming device 145. Player 125 differs from players 121 and 123 in that players 121 and 123 use their user devices 131 and 133, respectively to add funds to the gaming devices 141 and 143, respectively. In contrast, player 125 may use the UI of the gaming machine 145 to add funds directly to the gaming machine 145. The gaming device 145 generates an electronic record associated with the transaction to add funds and transfers the electronic record to the fraud monitoring system 101. Additionally, when player 125 cashes out of the machine 145, player 125 may receive a credit to his resort wallet or a voucher, the machine 145 generates an electronic record associated with player 125 cashing out, and transfers the electronic record to the fraud monitoring system 101. It should also be appreciated that the fraud monitoring system 101 may or may not be co-located on the same property or premises with the devices 144 and 145.

Figure 2:
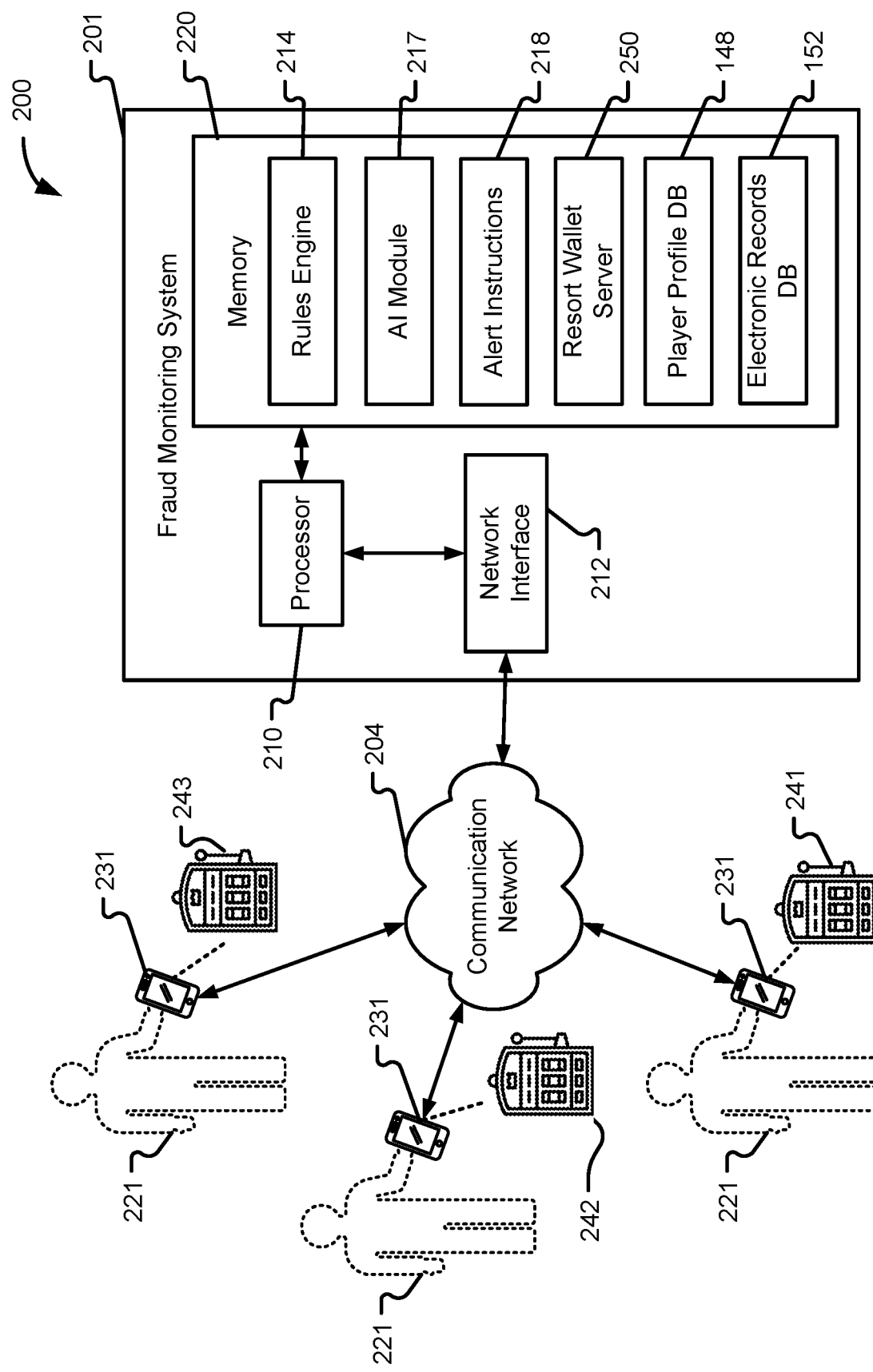
FIG. 2 is a block diagram of an alternative gaming environment in accordance with embodiments of the present disclosure.

FIG. 2 illustrates gaming environment 200 in accordance with the present disclosure. As shown in FIG. 2, player 221, using user device 231, interacts with various gaming machines 241-243. For example, player 221, using an electronic resort wallet on device 231, may add credits to gaming machine 241. An associated electronic record is generated. Within a short period of time, player 221 may debit the credits from gaming machine 241 and another electronic record is generated. Player 221 moves to gaming machine 242. Player 221 adds credits to gaming machine 242, which generates another electronic record. Player 221 may play a few games on gaming machine 242, but again, shortly after, player 221 debits the credits from gaming machine 242, and an associated electronic record is generated. Player 221 next moves to gaming machine 243, and similarly adds credits to gaming machine 243. An electronic record associated with the addition of credits is generated. Shortly thereafter, player 221 debits all the credits from gaming machine 243, which generates an associated electronic record. Additionally, player 221, debits the electronic resort wallet by transferring funds to an external bank account, an electronic record associated with the transfer is generated.

All the electronic records that are generated are transferred over the communication network 204 to the fraud monitoring system 201, which stores the electronic records. The rules engine 214 groups some or all of the transferred electronic records into a set of related electronic records. For example, the electronic records may be related by player, time, or device. The AI module 217 analyzes the set of related electronic records to determine if the electronic records constitute unusual or fraudulent activity. The AI module 217 is able to detect patterns that may otherwise go unnoticed. For example, the AI module 217 does not require set rules, such as a specified number of transactions/a specified amount in order to detect unusual activity. Additionally, a set of related electronic records may not constitute activity suspicious enough to trigger an alert to the casino, however, the AI module 217 may adjust thresholds for players that trigger additional monitoring.

In some embodiments, the electronic records are stored in a database 152. The electronic records database 152 allows for historical tracking and may be used for machine learning of the AI module 217. Each of player 221 actions, taken individually, may not constitute suspicious activity, however, when the transactions are grouped together into a set, a pattern may be detected. Alternatively, the composite amount of the electronic records may trigger an amount threshold, where the amounts separately would not. For example, transfers of $10,000.00 may trigger a SAR, but five $2,000.00 transaction may not, especially if the transfers are to different accounts. Furthermore, a player may use different means of funds transfers in order to obscure fraudulent activity. For example, a player may use an electronic resort wallet for some transactions, in conjunction with directly transferring funds through the UI of an EGM. Therefore, in some embodiments, the fraud monitoring system 201 may communicate with any device used to cause funds transfers, the device generates an electronic record associated with each transaction and transfers the electronic record to the fraud monitoring system 201. In some embodiments, the device may simply transfer data related with the transaction, and the fraud monitoring system 201 generates the electronic record.

Figure 3:
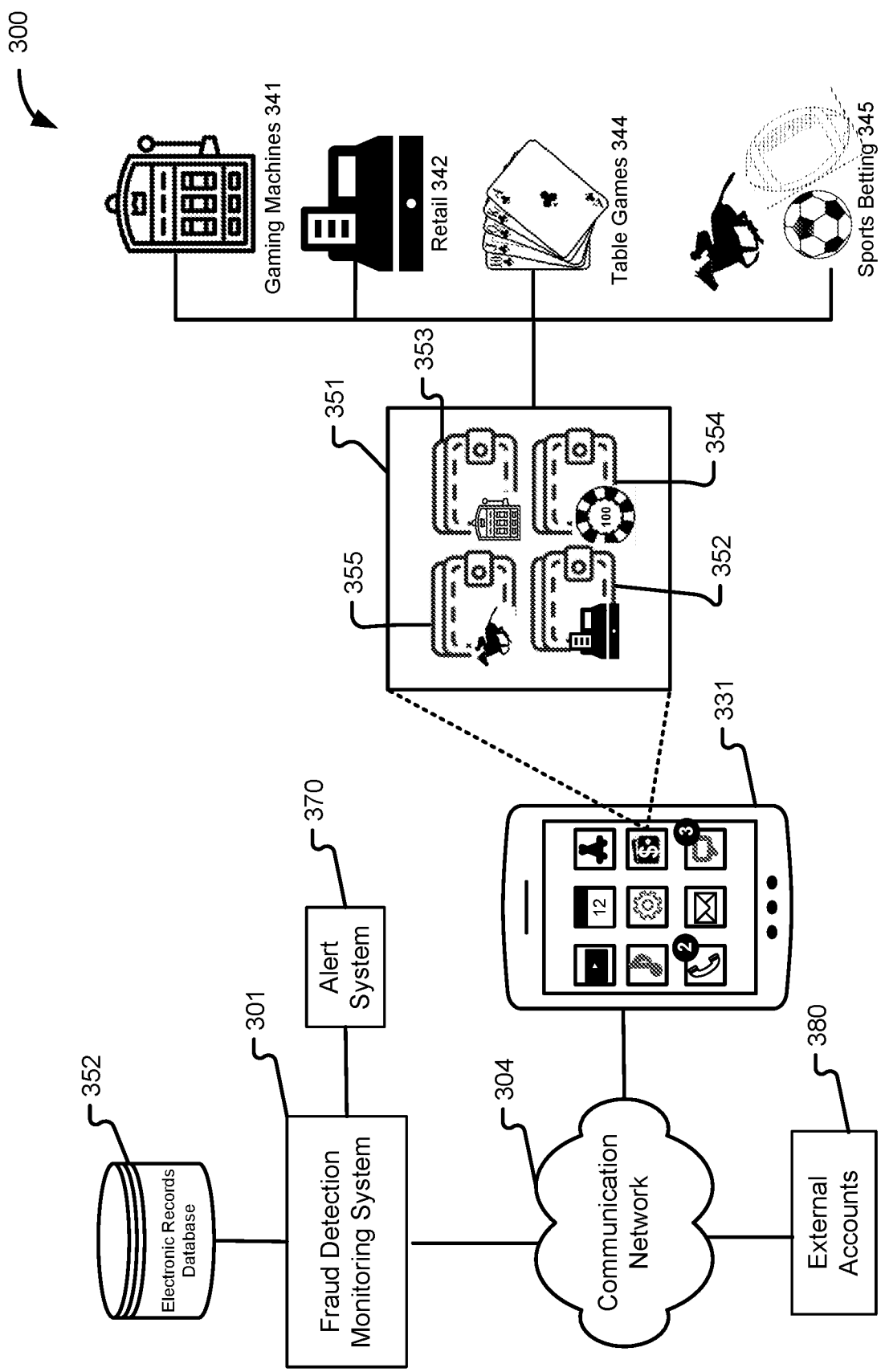
FIG. 3 is a block diagram of a gaming environment in accordance with embodiments of the present disclosure.

With reference to FIG. 3, an alternative gaming environment 300 is illustrated in accordance with the present disclosure. Gaming environment 300 includes fraud monitoring system 301, communication network 304, electronic records database 352, alert system 370, user device 331, external accounts 380, gaming machines 341, retail POS 342, table games 344, sports betting 345, and the electronic resort wallet app 351. In some embodiments resort wallet app 351 communicates with resort wallet server 150 or 250. Within the resort wallet app 351, there are four "sub-wallets": retail wallet 352, gaming wallet 353, table games wallet 354, and sports betting wallet 355. It should be appreciated that the illustrated "sub-wallets" are an example of the possible "sub-wallets" and should not be construed as limiting embodiments described herein. Examples of sports betting 345 include wagering on football games, basketball games, and horseracing. Examples of retail purchases 342 may comprise, restaurants, shopping, and hotels. Examples of gaming machines 341 include slot machines and video poker.

Sports betting 345, retail POS 342, table games 344, and gaming machines 341 illustrate various transaction types that may utilize the electronic resort wallet 351. That is to say, the electronic resort wallet 351 may comprise sub-wallets for each of gaming machines 341, retail 342, table games 344, and sports betting 345. When a player using device 331 makes a transaction using electronic resort wallet 351, an associated electronic record is created and sent to fraud monitoring system 301 over network 304. The electronic record is stored in the electronic records database 352.

In some embodiments, a player may use one or more external accounts 380 to add fund to the electronic resort wallet 351.

Figure 4:
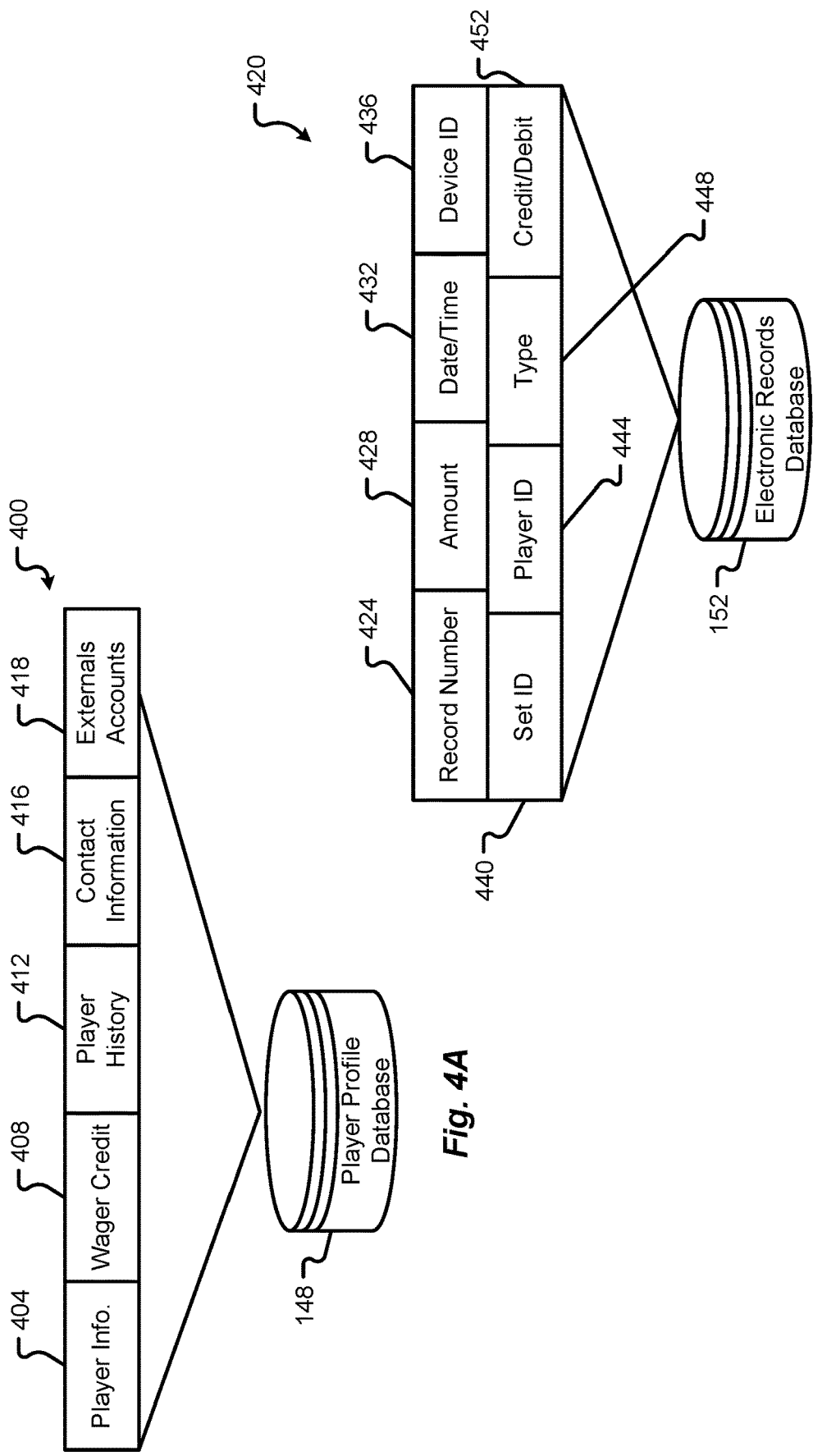
FIG. 4A is a block diagram depicting a first illustrative data structure used in accordance with embodiments of the present disclosure.
FIG. 4B is a block diagram depicting a second illustrative data structure used in accordance with embodiments of the present disclosure.

With reference now to FIGS. 4A and 4B, additional details of data structures that are useable in connection with fraud monitoring will be described in accordance with at least some embodiments of the present disclosure. It should be appreciated that the data structures depicted and described herein may be stored within a central database or may be distributed among a number of data storage nodes. Alternatively, or additionally, some or all of the fields of the data structures may be maintained in devices of the gaming environments 100, 200, and 300 such as the fraud monitoring systems 101, 201, and 301, and/or electronic records database 152 and 352—including combinations thereof without departing from the scope of the present disclosure.

With reference initially to FIG. 4A, details of a data structure 400 that may be maintained as part of a player profile will be described in accordance with at least some embodiments of the present disclosure. The database 148 may be configured to store one or multiple data structures 400 that are used in connection with tracking player progress and gaming history. In some embodiments, the data stored in the data structure 400 may be stored for a plurality of different player profiles or for a single player profile. Additionally, in some embodiments, rather than storing the actual data, the data stored may comprise a reference to another table and/or database that stores the actual data. As a non-limiting example, the data structure 400 may be used to store player loyalty information, player history information, and the like. Even more specifically, the data structure 400 may include a plurality of data fields that include, for instance, a player information field 404, a wager credit field 408, a player history field 412, a contact information field 416, an associated external accounts 418 field. The data structure 400 may also keep track of other information such as, but not limited to, total amount spent, gaming preferences, betting trends, associated devices, etc.

The player information field 404 may be used to store any type of information that identifies a player or a group of players. In some embodiments, the player information field 404 may store one or more of username information for a player, password information for a player account, player status information, accommodations associated with the player, and any other type of customer service management data that may be stored with respect to a player. Additionally, the player information field may reference another table and/or database that stores the information.

The wager credit field 408 may be used to store data about a player's available credit with a device, with a sports book, with a casino, and/or with a plurality of casinos. For instance, the wager credit field 408 may store an electronic record of available credit in the player's account and whether any restrictions are associated with such credit. The wager credit field 408 may further store information describing a player's available credit over time, cash out events for the player, winning events for the player, wagers placed by the player, tickets/vouchers issued to the player, and the like.

The player history field 412 may be used to store historical data for events that occur with respect to the player. For instance, the player history field 412 may store information related to a player's outcome in a game of chance, a player's outcome in a game of skill, a celebration event for a person other than the player, a player's involvement in a celebration event, a player visiting a predetermined location, a player playing a particular game, a player interacting with his mobile device, wagers placed by the player, tickets/vouchers issued for the player, tickets/vouchers redeemed by the player, etc.

The contact information field 416 may store information associated with a player's preferred modes of contact and how such contact can be made. For instance, the contact information field 416 may store information such as an email address, phone number, room number, player loyalty number, address, etc.

With reference now to FIG. 4B, details of another data structure 420 that may be used within the gaming environments 100, 200, and 300 will be described in accordance with at least some embodiments of the present disclosure. The database 152 may be configured to store one or multiple data structures 420 that are used in connection with monitoring electronic records for fraudulent activity. In some embodiments, the data stored in the data structure 420 may be stored for a plurality of electronic records and may or may not be organized based on events, player association, etc. As a non-limiting example, the data structure 420 include a plurality of data fields that include, for instance, a record number field 424, an amount field 428, a date/time field 432, a device ID field 436, a set ID field 440, a player ID field 444, a type field 448, and a credit/debit field 452. It should be appreciated that the data structure 420 may have greater or fewer fields than depicted in FIG. 4B.

The record number field 424 may be used to store a unique record number assigned to the electronic record when the record is generated. In some embodiments, the data stored in the record number field 424 may be randomly generated, pseudo-randomly generated, or sequentially generated based on when the electronic record is created. The amount field 428 may be used to store an electronic record of a monetary value for which the particular transaction that is associated with the electronic record. The amount field 428 may correspond to a data field that is written once and not updated. The date/time field 432 may store information describing when an electronic record is generated whereas the device field 436 may store information describing the device where the transaction occurred. For instance, the device field 436 may indicate a unique serial number assigned to a gaming device 141 and 143 that was associated with the electronic record and the date/time field 432 may store the time at which the electronic record was created using gaming device 143.

In some embodiments, the date/time field 432 may be populated based on a clock of the gaming device 143 or mobile device 133 rather than relying on the clock of the fraud monitoring system 101. Said another way, when credits are deducted from a gaming device, such information may be communicated back to the fraud monitoring system 101 along with a timestamp provided by the gaming device to indicate a time at which the gaming device was debited. Using the time indicated by the gaming device 143 can help account for or avoid problems associated with delays in communication over the communication network 104. Of course, it may also be possible or desirable to use the clock of the fraud monitoring system 101 as the centralized authority on all date/times entered into the field 432, thereby avoiding the need to synchronize or consideration synchronization issues between various gaming devices.

The set ID field 440 may be used to store information describing the set of related electronic records. That is to say, all records that are identified as being related, may be given the same set ID With reference now to FIG. 5, which illustrates electronic records database 552. Electronic records database 552 is an example of an electronic records database in accordance to embodiments disclosed herein. Electronic records database 552 is an example of electronic records database 152 and 352, although electronic records database 152 and 352 could use alternative configurations.

Electronic database 552 includes columns: "No.," "Player ID," "Wallet Type," "Time/Date," "Amount," "Debit/Credit," and "Transfer to an External Acct?" Electronic database 552 is for illustrative purposes, and electronic database 552 can include more, fewer, or different columns. The "Player ID" column identifies the player perceived to have conducted the transaction associated with the electronic record. In some embodiments, "No." comprises a record number, that uniquely identifies the electronic record. In some example, the record number is sequentially generated. In some embodiments, the Player ID may comprise a Player's number, loyalty number, mobile device identifier (e.g., MEID, ESN, IMEI), and/or name—including combinations thereof. The "Wallet Type" column identifies which wallet (e.g., retail, sports betting, gaming, wager, etc.), is used for the transaction. The "Time/Date" column stores timestamp information for the transaction. The "Amount" column indicates the dollar amount of the transaction. The "Debit/Credit" column indicates whether the transaction is a credit to the wallet or a debit from the wallet. For example, when a player transfers funds from an external account to the wallet, that may comprise a credit to the wallet. In another example, when a player adds funds to a gaming machine from the wallet, the transaction may comprise a debit from the wallet. The "Transfer to an External Acct?" column indicates whether the transaction involves a transfer to an external account. For example, when a player transfers from the wallet to an associated external account, "Yes," will be stored in the column. The fraud monitoring system may look for electronic records over a specified amount but may also look for multiple transactions based on amount and time.

As shown, the first three rows in electronic records database may be grouped by the rules engine into a set of related records 500. It should be appreciated that electronic database 552 may include records that occurred before, after, and between the first three records shown, but are omitted for ease of illustration. The rules engine may group the first three electronic records into a set based on time, player ID, and/or amount. Although, more or fewer properties of the electronic records may be used to group the records into a set of related records. That is to say, the records may be grouped based on player ID and time, or just player ID. Record No. 6 in electronic database 552 is also associated with player ID "1234," however, that record is not grouped into the set of related records 500, as the detection module 116 and/or the AI module 217 did not determine that Record No. 6 was related to the other three electronic records. In some embodiments, the detection module 116 determines whether there is unusual activity based on the set of related electronic records. In other embodiments, the AI module 217 analyzes the set of related records to determine if the electronic records constitute unusual/fraudulent activity. If the detection module 116 or the AI module 217 detects suspicious activity, an alert may be triggered. For example, a corporate security system may be alerted to review the set of related electronic records to determine whether further action is required. In some embodiments, the casino may individually configure the trigger and/or alerts.

Figure 6:
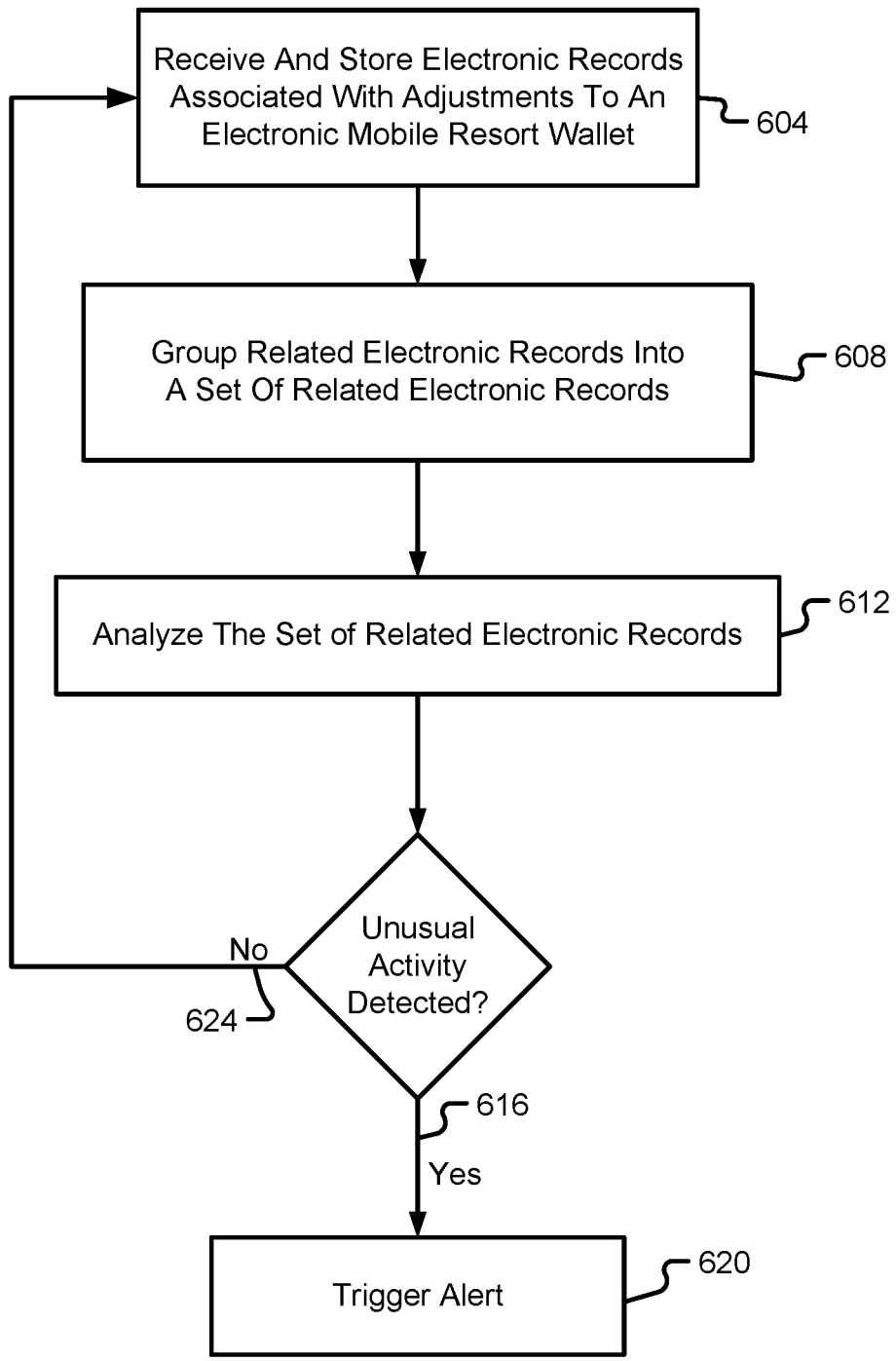
FIG. 6 is a flow diagram depicting a further method of managing electronic records in accordance with embodiments of the present disclosure.

With reference now to FIG. 6, a method of fraud monitoring will be described in accordance with at least some embodiments of the present disclosure. The method begins by receiving and storing electronic records, where the electronic records are associated with adjustments to an electronic resort wallet 351 (step 604). For example, if the player makes a retail transaction, an electronic record may be generated based on that transaction. In another example, if a player adds funds to a gaming machine 141, 143, or 241-243, table game 344, and/or sports betting 345, an electronic record is created and transferred to a fraud monitoring system 101, 201, or 301. Continuing that example, another electronic record will be generated when the player transfers funds from the gaming machine 141, 143, or 241-243, table game 344, and/or sports betting 345 back to the electronic resort wallet 351. For example, if a player wants to cash-in his chips, or transfer winnings from a sport wager. In some embodiments, the player may transfer funds from the electronic resort wallet 351 to an external bank account 380, and another electronic record associated with the external transfer is created.

The fraud monitoring system 101, 201, and/or 301 further groups related electronic records into a set of related electronic records 500 (step 608). For example, a rules engine 114 or 214 may group records by player and/or time. Electronic records may additionally or alternatively be grouped by amount, type, external account information, etc. In some embodiments, the rules engine 114 or 214 may group transactions that occur within a time period. In some embodiments, certain events may trigger an extension of the time period in which electronic records may be determined to be related.

The fraud monitoring system 101, 201, or 301 analyzes the set of related electronic records to detect unusual activity using detection module 116 and/or AI module 217 (step 612). In some embodiments, fraud monitoring system may comprise an AI module that intelligently analyzes associated records to determine if the records indicate, fraudulent, or abnormal activity (e.g., the activity falls outside of a normal behavior defined by a behavioral model). For example, if a player transfers a large sum from an external account, then adds the transferred funds to a gaming machine, and shortly after cashes out, and transfers the funds back to the external account, the fraud monitoring system 101, 201, or 301 may detect this as unusual activity. However, the AI module 217 does not require that a specified number of transactions and/or amount be required. The AI module 217 is able to detect patterns in electronic records that may constitute unusual or suspicious activity, rather than requiring certain thresholds to be met.

Upon detection of unusual activity (step 616), an alert is triggered (step 620). In some embodiments, the alert is local to the property where the unusual activity is detected. For example, a casino employee may be alerted that additional review of the related electronic records is required to determine whether a SAR is necessary. In other embodiments, the alert is sent directly to a law enforcement agency for further review/action. If no unusual activity is detected (step 624), the process continues with step 604.

Figure 7:
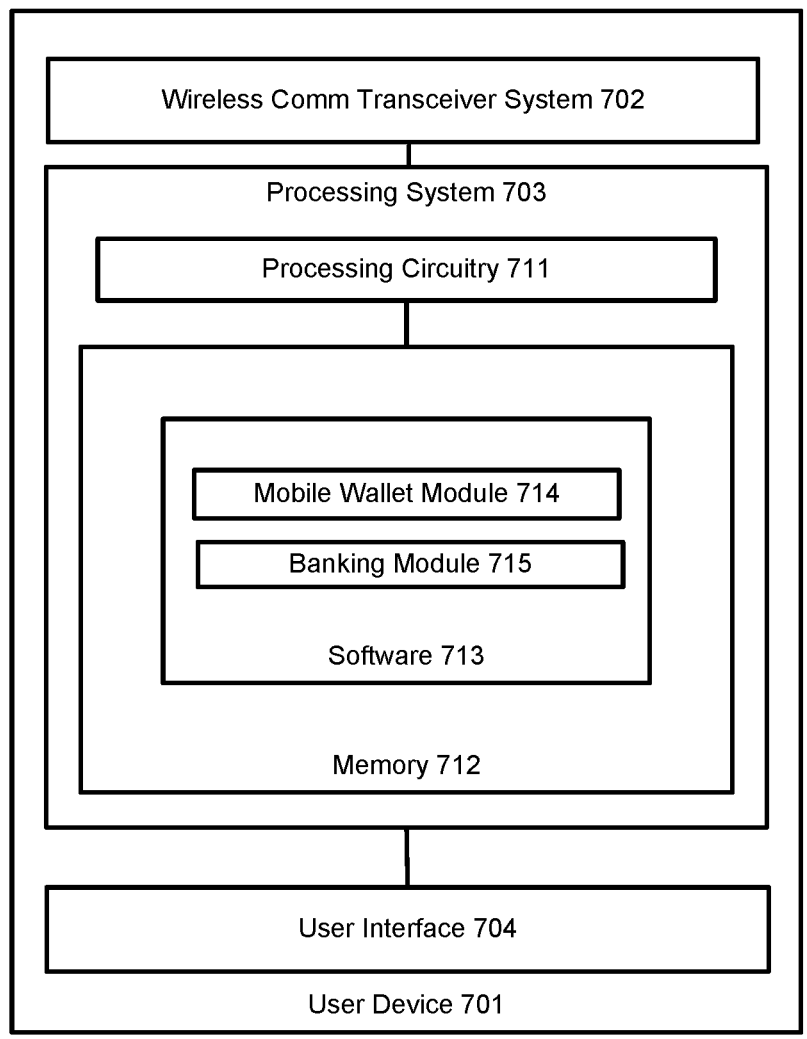
FIG. 7 is a block diagram of a gaming device in accordance with embodiments of the present disclosure.

With reference to FIG. 7, a user device 701 in accordance with at least some embodiments of the present disclosure. User device 701 is an example of UEs 131-133, although UEs 131-135 could use alternative configurations. In some embodiments, a player uses user device 701 to store and access an electronic resort wallet in accordance with the present disclosure. User device 701 comprises wireless communication transceiver system 702, processing system 703, and user interface 704. Processing system 703 is linked to wireless communication transceiver system 702 and user interface 704. Processing system 703 includes processing circuitry 711 and memory 712 that stores operating software 713. User device 701 may include other well-known components such as a battery and enclosure that are not shown for clarity. User device 701 may be a cellular phone, mobile phone, smartphone, personal digital assistant (PDA), computer, laptop, tablet, e-book, mobile Internet appliance, media player, game console, wearable computing device, wireless network interface card, or some other wireless communication apparatus—including combinations thereof.

Wireless communication transceiver system 702 comprises RF communication circuitry and an antenna. The RF communication circuitry typically includes an amplifier, filter, RF modulator, and signal processing circuitry. Wireless communication transceiver system 702 may also include memory, software, processing circuitry, or some other communication device. Wireless communication transceiver system 702 may use various communication formats, such as LTE, CDMA, EVDO, WIMAX, GSM, WIFI, HSPA, or some other wireless communication format—including combinations thereof.

User interface 704 comprises components that interact with a user to receive user inputs and to present media and/or information. User interface 704 may include a speaker, microphone, buttons, lights, display screen, touch screen, touch pad, scroll wheel, communication port, or some other user input/output apparatus—including combinations thereof. User interface 704 may be omitted in some examples.

Processing circuitry 711 comprises microprocessor and other circuitry that retrieves and executes software 713 from memory 712. Memory 712 comprises a non-transitory storage medium, such as a disk drive, flash drive, data storage circuitry, or some other memory apparatus. Processing circuitry 711 is typically mounted on a circuit board that may also hold memory 712, portions of wireless communication transceiver system 702, and user interface 704. Software 713 comprises computer programs, firmware, or some other form of machine-readable processing instructions. Software 713 may include an operating system, utilities, drivers, network interfaces, applications, or some other type of software.

When executed, software 713 directs processing system 703 to operate as described herein to allow a user to use an electronic resort wallet to conduct various transactions. In particular, the wallet module 714 directs processing system 703 to conduct various transactions in a gaming establishment, such as adding/deducting funds from gaming machines, making a sports wager, and making non-gaming purchases. The banking module 716 directs processing system 703 to establish a communication session with an external banking institution in order to transfer funds to/from the mobile wallet.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A fraud monitoring system, comprising:
a communication interface that facilitates communications with a gaming device;
a processor coupled with the communication interface; and
a computer memory coupled with the processor, the computer memory comprising processor-executable instructions that, when executed by the processor, cause the processor to:
receive and store electronic records from the gaming device, wherein the electronic records are associated with adjustments to an electronic resort wallet, wherein the adjustments to the electronic resort wallet comprise a balance transfer to the electronic resort wallet from a first external account and a balance transfer to a second external account from the electronic resort wallet;
execute a rules engine to group related electronic records into a set of related electronic records;
execute an artificial intelligence module to determine if the set of related electronic records comprises unusual activity; and
trigger an alert when the unusual activity is detected.

2. The fraud monitoring system of claim 1, wherein the unusual activity is detected when the set of related electronic records comprise a total adjustment within a predetermined timeframe that exceeds a threshold.

3. The fraud monitoring system of claim 1, wherein the unusual activity is detected when the set of related electronic records comprises a total transfer to an external account within a predetermined timeframe that exceeds a threshold.

4. The fraud monitoring system of claim 1, wherein the unusual activity is detected when the set of related electronic records comprises an adjustment that exceeds a threshold.

5. The fraud monitoring system of claim 1, wherein the electronic records are associated with a single gaming location.

6. The fraud monitoring system of claim 1, wherein the electronic records are associated with a single gaming corporation with more than one location.

7. The fraud monitoring system of claim 1, wherein the electronic records are associated with multiple gaming corporations.

8. The fraud monitoring system of claim 1, wherein the electronic records comprise a first data field that indicates the gaming device and a second data field that indicates a player's identity.

9. The fraud monitoring system of claim 1, wherein the alert comprises a Suspicious Activity Report (SAR).

10. A method of operating a fraud monitoring system, the method comprising:
    receiving and storing electronic records from a gaming device, wherein the electronic records are associated with adjustments to an electronic resort wallet, wherein the adjustments to the electronic resort wallet comprise a balance transfer to the electronic resort wallet from a first external account and a balance transfer to a second external account from the electronic resort wallet;
    executing a rules engine to group related electronic records into a set of related electronic records;
    executing an artificial intelligence module to analyze the set of related electronic records to determine if the set of related electronic records comprises unusual activity; and
    triggering an alert when the unusual activity is detected.

11. The method of claim 10, wherein the unusual activity is detected when the set of related electronic records comprises a total adjustment within a predetermined timeframe that exceeds a threshold.

12. The method of claim 10, wherein the unusual activity is detected when the set of related electronic records comprises a total transfer to an external account within a predetermined timeframe that exceeds a threshold.

13. The method of claim 10, wherein the unusual activity is detected when the set of related electronic records comprises an adjustment that exceeds a threshold.

14. The method of claim 10, wherein the electronic records are associated with a single gaming location.

15. The method of claim 10, wherein the electronic records are associated with multiple gaming corporations.

16. The method of claim 10, wherein the electronic records comprise a first data field that indicates the gaming device and a second data field that indicates a player's identity.

17. A server device, comprising:
    a communication interface;
    a processor coupled with the communication interface; and
    a computer-readable storage medium, coupled with the processor, comprising instructions that are executable by the processor, wherein the instructions comprise:
        instructions that receive and store electronic records, wherein the electronic records are associated with adjustments to an electronic resort wallet, wherein the adjustments to the electronic resort wallet comprise a balance transfer to the electronic resort wallet from a first external account and a balance transfer to a second external account from the electronic resort wallet;
        instructions that execute a rules engine to group related electronic records into a set of related electronic records;
        instructions that execute an artificial intelligence module to determine if the set of related electronic records comprises unusual activity; and
        instructions that trigger an alert when the unusual activity is detected.

* * * * *